US008482905B2

(12) United States Patent
Mooney et al.

(10) Patent No.: US 8,482,905 B2

(45) Date of Patent: Jul. 9, 2013

(54) MOUNTING MODULES FOR A DC DISTRIBUTION ASSEMBLY

(75) Inventors: Brian Frederick Mooney, Colchester, CT (US); Mariusz Duda, Windsor Locks, CT (US); Nicholas Ryan Goodine, Bristol, CT (US); Eric Duane Rowland, Glastonbury, CT (US); Ganesh Venkataraman, Rocky Hill, CT (US); Michael Richard Wood, Southington, CT (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 13/181,933

(22) Filed: Jul. 13, 2011

(65) Prior Publication Data

US 2013/0016455 A1 Jan. 17, 2013

(51) Int. Cl.
*H02B 1/00* (2006.01)

(52) U.S. Cl.
USPC ............ 361/637; 361/634; 361/652; 361/673

(58) Field of Classification Search
USPC .......................................... 361/637, 644, 673
See application file for complete search history.

(56) References Cited

U.S. PATENT DOCUMENTS

| | | | | |
|---|---|---|---|---|
| 4,419,649 | A | 12/1983 | Walker et al. | |
| 4,667,268 | A * | 5/1987 | Mrowka | 361/634 |
| 5,046,173 | A * | 9/1991 | Wall, Jr. | 361/634 |
| 5,126,918 | A * | 6/1992 | Morby et al. | 361/644 |
| 5,295,042 | A * | 3/1994 | Midgley et al. | 361/634 |
| 5,394,296 | A * | 2/1995 | Erickson et al. | 361/659 |
| 7,189,935 | B1 | 3/2007 | Hassan et al. | |
| 7,298,606 | B2 * | 11/2007 | M'Sadoques et al. | 361/644 |
| 7,633,365 | B2 | 12/2009 | Harmon et al. | |
| 7,718,908 | B2 | 5/2010 | Mruthunjaya et al. | |
| 2005/0213289 | A1 * | 9/2005 | M'Sadoques et al. | 361/624 |

* cited by examiner

*Primary Examiner* — Gregory Thompson
(74) *Attorney, Agent, or Firm* — Cantor Colburn LLP

(57) ABSTRACT

A mounting module for a DC distribution assembly is provided. The module includes a base portion that holds at least first and second electrically conductive straps thereon. The straps are disposed on and coupled to the electrically non-conductive base portion. The module further includes a first breaker pole assembly having a first line side electrically coupled to the first electrically conductive strap. The mounting module further includes a second breaker pole assembly having a second line side electrically coupled to the second electrically conductive strap.

20 Claims, 17 Drawing Sheets

MOUNTING MODULES FOR A DC DISTRIBUTION ASSEMBLY

BACKGROUND OF THE INVENTION

In DC electrical equipment assemblies, cables have been utilized to electrically couple together individual circuit breaker poles in series with one another. However, the numerous cables in a circuit breaker are difficult to install and undesirably result in a relatively cluttered mass of cables in the DC distribution assembly.

The inventors herein have recognized a need for an improved mounting module in a DC distribution assembly.

BRIEF DESCRIPTION OF THE INVENTION

A mounting module for a DC distribution assembly in accordance with an exemplary embodiment is provided. The mounting module includes an electrically non-conductive base portion configured to hold at least first and second electrically conductive straps thereon. The first and second electrically conductive straps are disposed on and coupled to the electrically non-conductive base portion. The mounting module further includes a first breaker pole assembly having a first line side electrically coupled to the first electrically conductive strap. The first breaker pole assembly further includes a first load side, and a first breakable pole disposed between the first line side and the first load side. The mounting module further includes a second breaker pole assembly having a second line side electrically coupled to the second electrically conductive strap. The second breaker pole assembly further includes a second load side, and a second breakable pole disposed between the second line side and the second load side.

A mounting module for a DC distribution assembly in accordance with another exemplary embodiment is provided. The mounting module includes an electrically non-conductive base portion configured to hold at least first and second electrically conductive straps thereon. The first and second electrically conductive straps are disposed on and coupled to the electrically non-conductive base portion. The mounting module further includes a first breaker post coupled to the first electrically conductive strap. The mounting module further includes a second breaker post coupled to the second electrically conductive strap. The mounting module further includes a third breaker post coupled to the second electrically conductive strap. The mounting module further includes a first breaker pole assembly having a first line side coupled to the first breaker post, and a first load side coupled to the second breaker post. The first breaker pole assembly has a first breakable pole disposed between the first line side and the first load side. The first breaker pole assembly further includes a second breaker pole assembly having a second line side coupled to the third breaker post, and a second load side. The second breaker pole assembly further includes a second breakable pole disposed between the second line side and the second load side.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
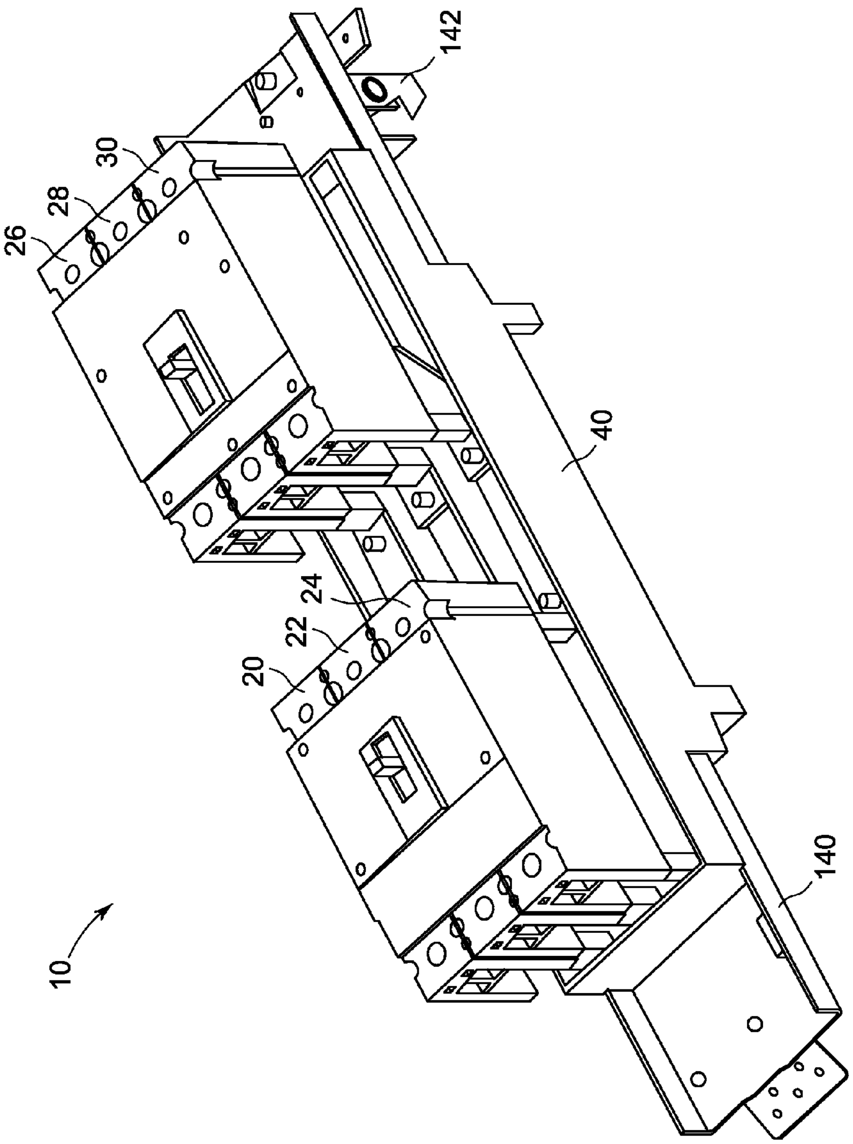
FIG. 1 is a schematic of a mounting module for a DC distribution assembly that is configured to electrically break three positive poles in each group of breaker pole assemblies in accordance with an exemplary embodiment.

The detailed description explains embodiments of the invention, together with advantages and features, by way of example with reference to the drawings.

DETAILED DESCRIPTION OF THE INVENTION

Referring to FIGS. 1-6, a mounting module 10 that is configured to be removably coupled to a DC distribution assembly 12, in accordance with an exemplary embodiment is provided. The mounting module 10 includes breaker pole assemblies 20, 22, 24, 26, 28, 30, an electrically non-conductive base portion 40, electrically conductive straps 50, 52, 54, 56, 58, bolts 70, 72, 76, 78, 80, 82, 84, 86, 88, 98, 99, breaker posts 100, 102, 104, 106, 120, 122, 124, 126, mounting assemblies 140, 142, and an attachment assembly 150. The mounting module 10 is configured to electrically break three positive breakable poles in each group of breaker pole assemblies (e.g. one group being the breaker pole assemblies 20, 22, 24) if an excess amount of electrical current is detected. For purposes of understanding, the term "breaker pole assembly" refers to a device that has a breakable pole that can interrupt a flow of electrical current if an excess amount of electrical current is detected. For example, a breaker pole assembly can comprise at least one of a circuit breaker or a molded case switch for example. The DC distribution assembly 12 can comprise at least one of a DC panelboard, a DC switchboard, a DC motor control center, and a DC busplug for example.

Figure 2:
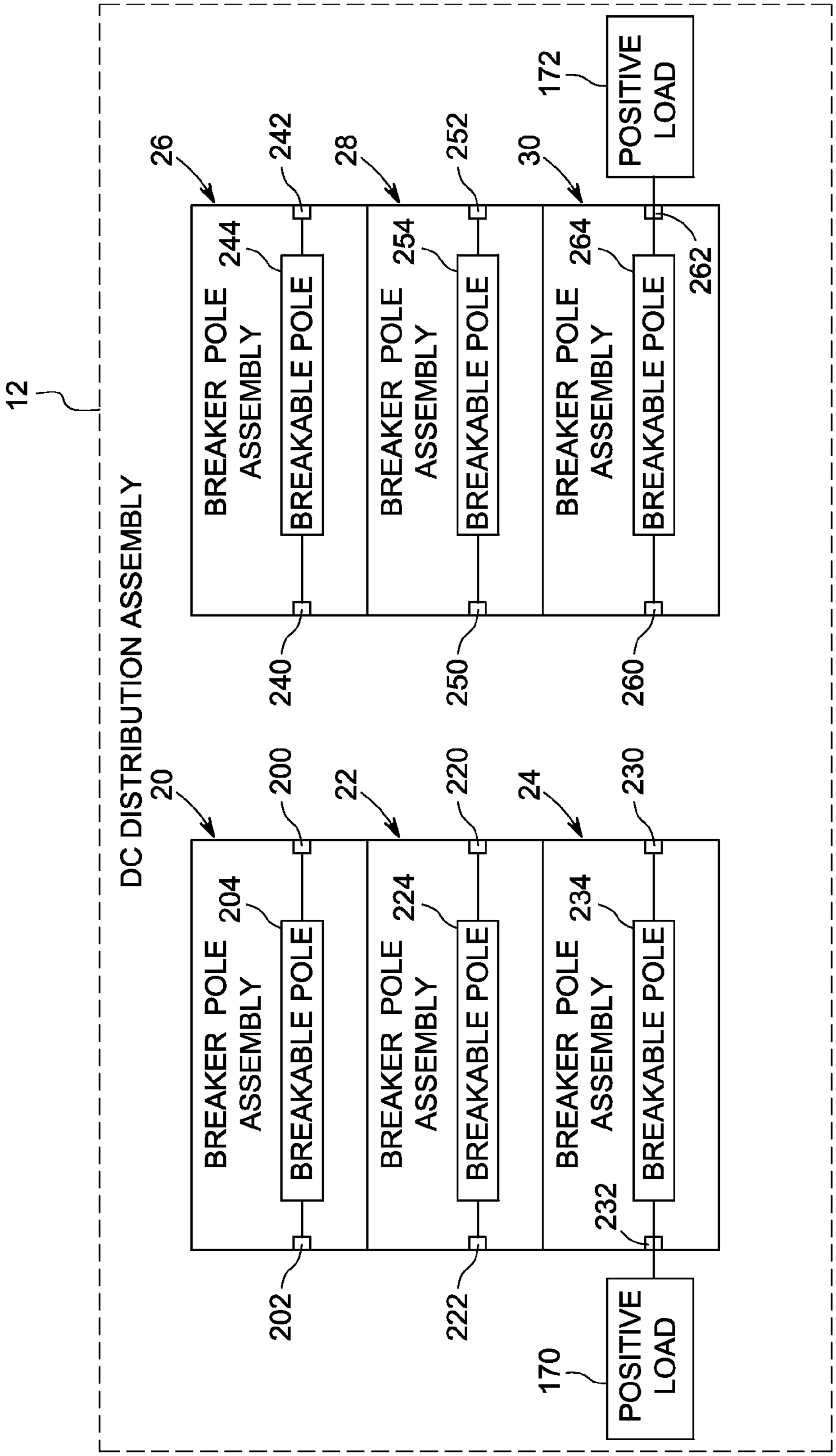
FIG. 2 is a block diagram of a portion of the mounting module of FIG. 1.
Figure 6:
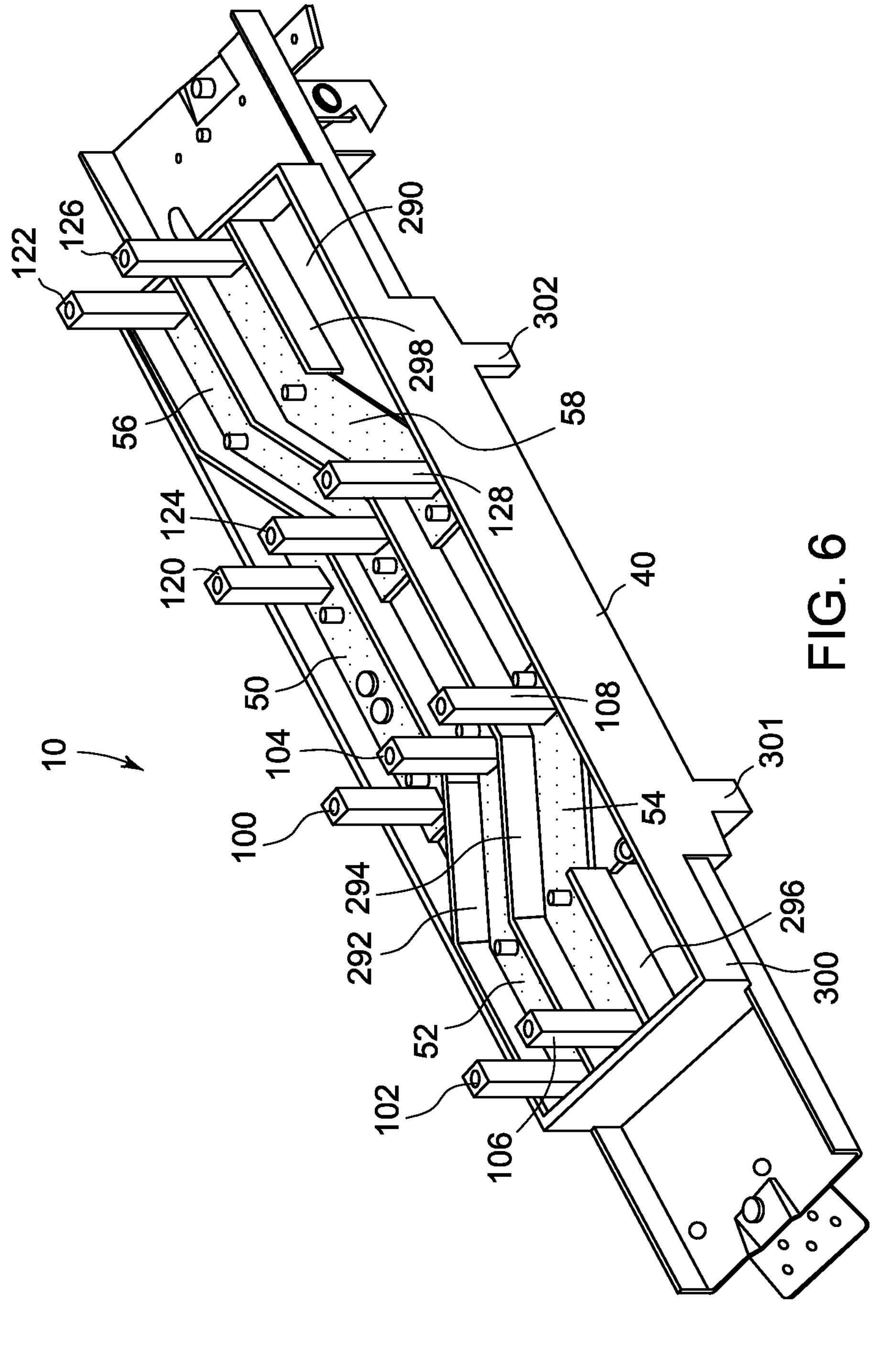
FIG. 6 is another isometric view of a portion of the mounting module of FIG. 1.

Referring to FIGS. 1, 2 and 6, the breaker pole assemblies 20-30 are each configured to have a breakable pole that is selectively broken when an excess amount of electrical current is detected through the respective breaker pole assembly to thereafter prevent the excess amount of electrical current from flowing through the respective breaker pole assembly. Each of the breaker pole assemblies 20-30 can be manually reset as known to those skilled in the art so that an electrical current can thereafter flow through the respective breakable poles. In one exemplary embodiment, each of the breaker pole assemblies 20-30 are double contact-pair assemblies. In an alternative embodiment, the breaker pole assemblies 20-30 are single contact-pair assemblies.

Referring to FIGS. 2 and 6, the breaker pole assembly 20 includes a line side 200, a load side 202, and a breakable pole 204 operably disposed between the line side 200 and the load side 202. In one exemplary embodiment, the line side 200 is electrically and physically coupled to the breaker post 100, and the load side 202 is electrically and physically coupled to the breaker post 102.

The breaker pole assembly 22 includes a line side 220, a load side 222, and a breakable pole 224 operably disposed between the line side 220 and the load side 222. In one exemplary embodiment, the line side 220 is electrically and physically coupled to the breaker post 104, and the load side 222 is electrically and physically coupled to the breaker post 106.

The breaker pole assembly 24 includes a line side 230, a load side 232, and a breakable pole 234 operably disposed between the line side 230 and the load side 232. In one exemplary embodiment, the line side 230 is electrically and physically coupled to the breaker post 108, and the load side 232 is electrically coupled to the positive load 170.

The breaker pole assembly 26 includes a line side 240, a load side 242, and a breakable pole 244 operably disposed between the line side 240 and the load side 242. In one exemplary embodiment, the line side 240 is electrically and physically coupled to the breaker post 120, and the load side 242 is electrically and physically coupled to the breaker post 122. The breaker pole assembly 26 is disposed longitudinally across from the breaker pole assembly 20.

The breaker pole assembly 28 includes a line side 250, a load side 252, and a breakable pole 254 operably disposed between the line side 250 and the load side 252. In one exemplary embodiment, the line side 250 is electrically and physically coupled to the breaker post 124, and the load side 252 is electrically and physically coupled to the breaker post 126. The breaker pole assembly 28 is disposed longitudinally across from the breaker pole assembly 22.

The breaker pole assembly 30 includes a line side 260, a load side 262, and a breakable pole 264 operably disposed between the line side 260 and the load side 262. In one exemplary embodiment, the line side 260 is electrically and physically coupled to the breaker post 128, and the load side 262 is electrically coupled to the positive load 172. The breaker pole assembly 30 is disposed longitudinally across from the breaker pole assembly 24.

Figure 7:
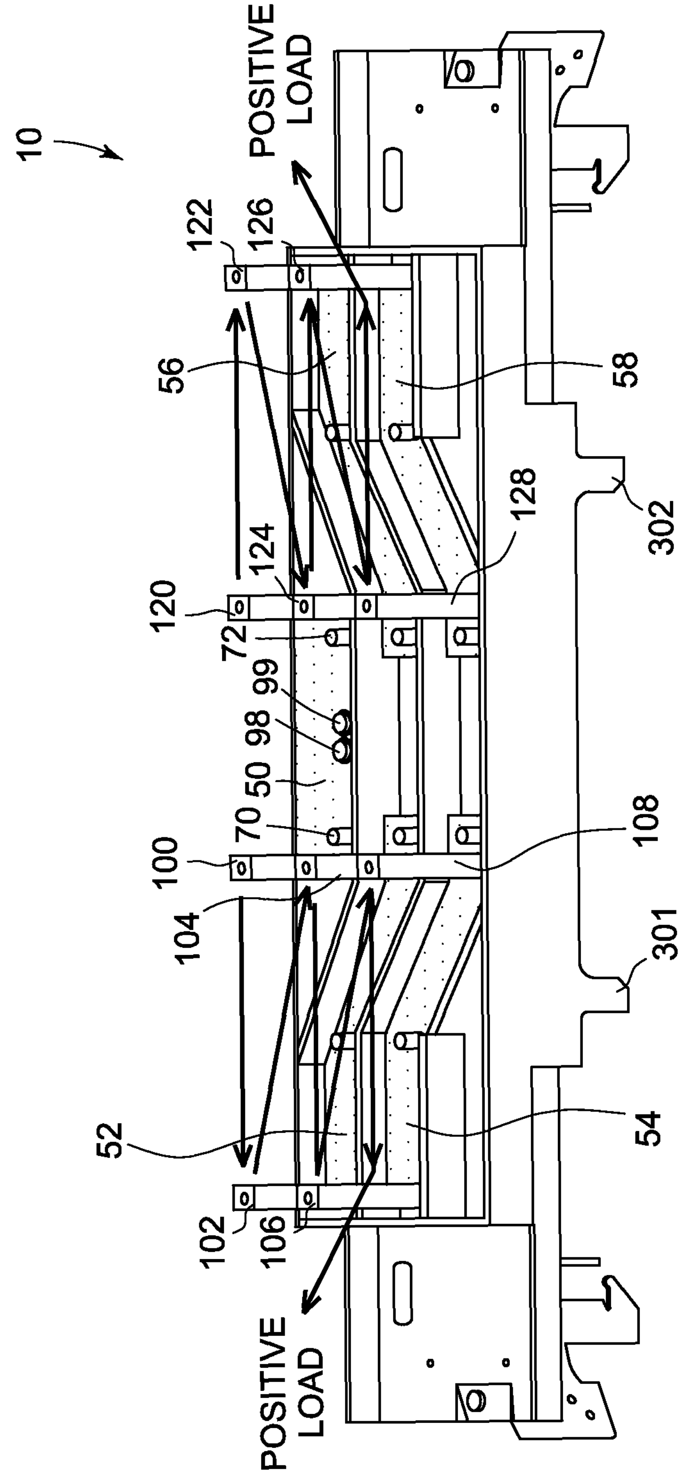
FIG. 7 is another isometric view of a portion of the mounting module of FIG. 1 illustrating a general direction of electrical current flow through the mounting module.

Referring to FIGS. 6 and 7, the electrically non-conductive base portion 40 is provided to hold the other components of the mounting module 10 thereon. In one exemplary embodiment, the base portion 40 is constructed of plastic. Of course, the base portion 40 could be constructed from other types of materials known to those skilled in the art. The base portion 40 includes a base plate 290, walls 292, 294, 296, 298, a peripheral wall 300, and standoffs 301, 302. The walls 292, 294, 296, 298 and the peripheral wall 300 extend outwardly from a first side of the base plate 290. The standoffs 301, 302 extend outwardly from a second side of the base plate 290. The walls 292, 294, 296, 298 are used to partition the first side of the base plate 290 into respective regions for receiving the electrically conductive straps 50, 52, 54, 56, 58 therein, and to also prevent electrical discharges from occurring between the electrically conductive straps 50, 52, 54, 56, 58.

Figure 3:
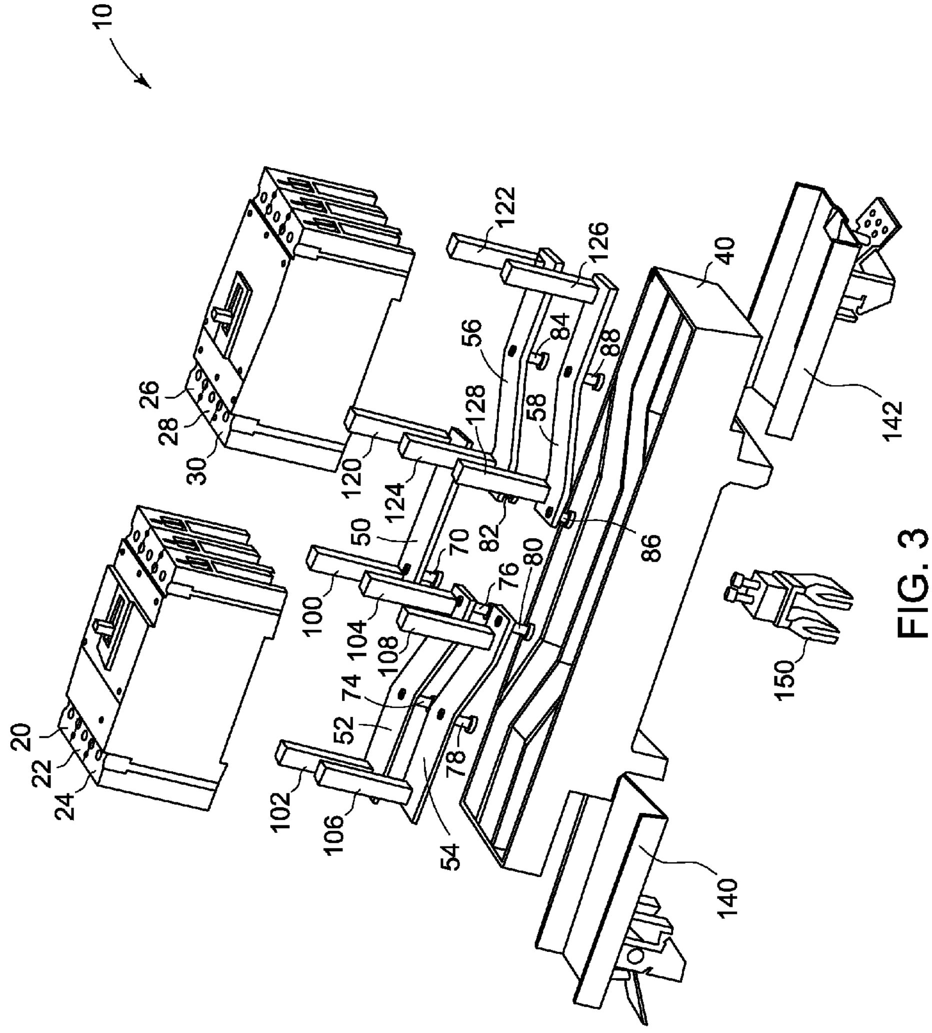
FIG. 3 is an exploded view of the mounting module of FIG. 1.
Figure 4:
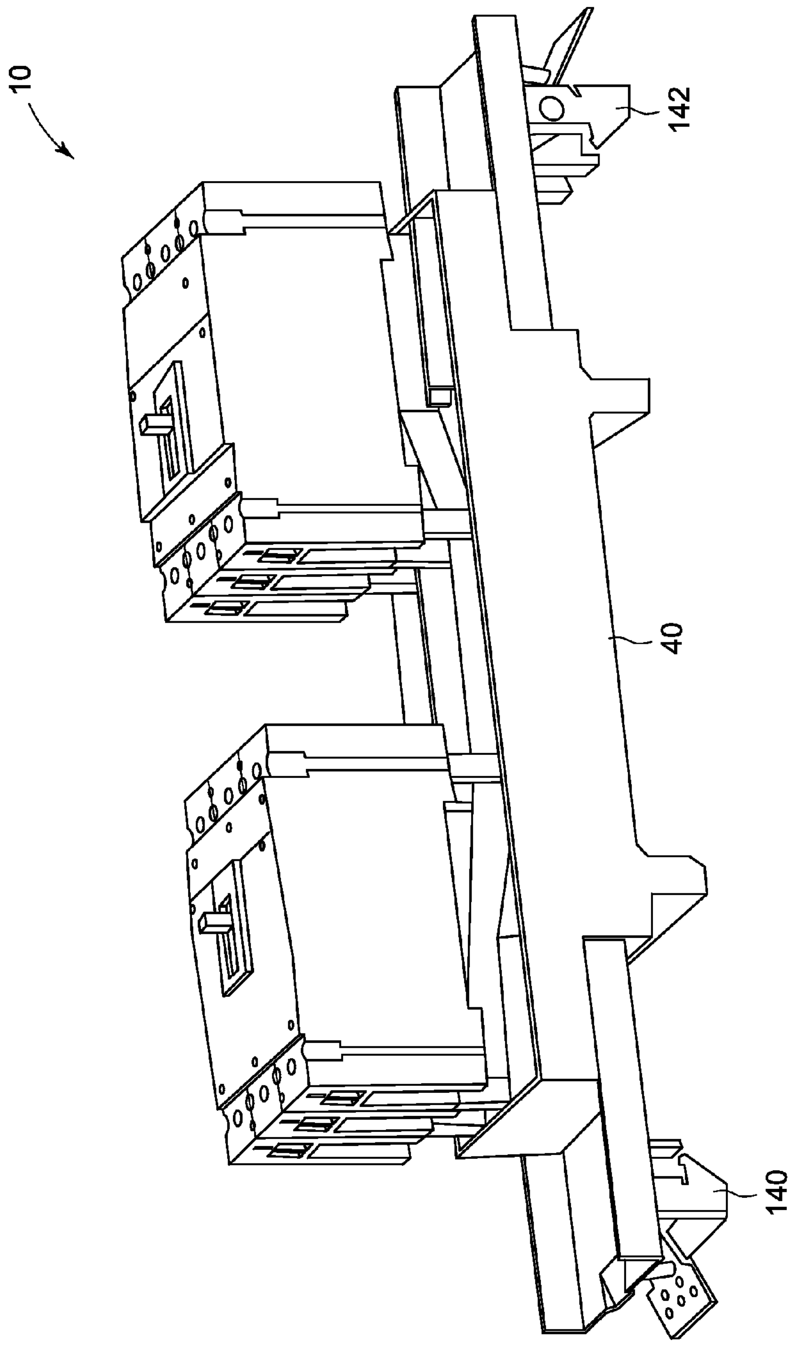
FIG. 4 is an isometric view of the mounting module of FIG. 1.

Referring to FIGS. 3, 6 and 7, the electrically conductive straps 50, 52, 54, 56, 58 are provided to electrically couple the breaker pole assemblies 20-30 to the DC distribution assembly 12 via the breaker posts 100-126 and the attachment assembly 150. In one exemplary embodiment, the electrically conductive straps 50, 52, 54, 56, 58 are constructed of copper or a copper-alloy. Of course, in alternative embodiments, the electrically conductive straps 50, 52, 54, 56, 58 could be constructed of other materials known to those skilled in the art.

The electrically conductive strap 50 is disposed on the first side of the base portion 40 between the peripheral wall 300 and the wall 292. The electrically conductive strap 50 is coupled to the base portion 40 utilizing bolts 70, 72 that extend through first and second apertures in the strap 50. The bolts 98, 99 are utilized to physically and electrically couple the strap 52 to the attachment assembly 150 that is further configured to be coupled to the DC distribution assembly 12 to receive a positive DC voltage polarity from the DC distribution assembly 12.

The electrically conductive strap 52 is disposed on the first side of the base portion 40 between a portion of the peripheral wall 300 and the walls 292, 294. The electrically conductive strap 52 is coupled to the base portion 40 utilizing the bolts 74, 76 that extend through first and second apertures in the strap 52.

The electrically conductive strap 54 is disposed on the first side of the base portion 40 between a portion of the peripheral wall 300 and the walls 294, 296. The electrically conductive strap 54 is coupled to the base portion 40 utilizing the bolts 78, 80 that extend through first and second apertures in the strap 54.

The electrically conductive strap 56 is disposed on the first side of the base portion 40 between a portion of the peripheral wall 300 and the walls 292, 294. The electrically conductive strap 56 is coupled to the base portion 40 utilizing the bolts 82, 84 that extend through first and second apertures in the strap 56.

The electrically conductive strap 58 is disposed on the first side of the base portion 40 between a portion of the peripheral wall 300 and the walls 294, 298. The electrically conductive strap 58 is coupled to the base portion 40 utilizing bolts 86, 88 that extend through first and second apertures in the strap 58.

Referring to FIGS. 2 and 6, the breaker posts 100, 120 are physically and electrically coupled to the electrically conductive strap 50 utilizing bolts. In one exemplary embodiment, the breaker post 100 is also physically and electrically coupled to the line side 200 of the breaker pole assembly 20. Also, the breaker post 120 is physically and electrically coupled to the line side 240 of the breaker pole assembly 26. In an alternative embodiment, the breaker posts 100, 120 are integrally formed with the electrically conductive strap 50 to obtain an electrically conductive strap having a similar shape as the breaker posts 100, 120 and the strap 50.

The breaker posts 102, 104 are physically and electrically coupled to the electrically conductive strap 52 utilizing bolts. In one exemplary embodiment, the breaker post 102 is also physically and electrically coupled to the load side 202 of the breaker pole assembly 20. Also, the breaker post 104 is physically and electrically coupled to the line side 220 of the breaker pole assembly 22. In an alternative embodiment, the breaker posts 102, 104 are integrally formed with the electrically conductive strap 52 to obtain an electrically conductive strap having a similar shape as the breaker posts 102, 104 and the strap 52.

The breaker posts 106, 108 are physically and electrically coupled to the electrically conductive strap 54 utilizing bolts. In one exemplary embodiment, the breaker post 106 is also physically and electrically coupled to the load side 222 of the breaker pole assembly 22. Also, the breaker post 108 is physically and electrically coupled to the line side 230 of the breaker pole assembly 24. In an alternative embodiment, the breaker posts 106, 108 are integrally formed with the electrically conductive strap 54 to obtain an electrically conductive strap having a similar shape as the breaker posts 106, 108 and the strap 54.

The breaker posts 122, 124 are physically and electrically coupled to the electrically conductive strap 56 utilizing bolts. In one exemplary embodiment, the breaker post 122 is also physically and electrically coupled to the load side 242 of the breaker pole assembly 26. Also, the breaker post 124 is physically and electrically coupled to the line side 250 of the breaker pole assembly 28. In an alternative embodiment, the breaker posts 122, 124 are integrally formed with the electrically conductive strap 56 to obtain an electrically conductive strap having a similar shape as the breaker posts 122, 124 and the strap 56.

The breaker posts 126, 128 are physically and electrically coupled to the electrically conductive strap 58 utilizing bolts. In one exemplary embodiment, the breaker post 126 is also physically and electrically coupled to the load side 252 of the breaker pole assembly 28. Also, the breaker post 128 is physically and electrically coupled to the line side 260 of the breaker pole assembly 30. In an alternative embodiment, the breaker posts 126, 128 are integrally formed with the electrically conductive strap 58 to obtain an electrically conductive strap having a similar shape as the breaker posts 126, 128 and the strap 58.

Figure 5:
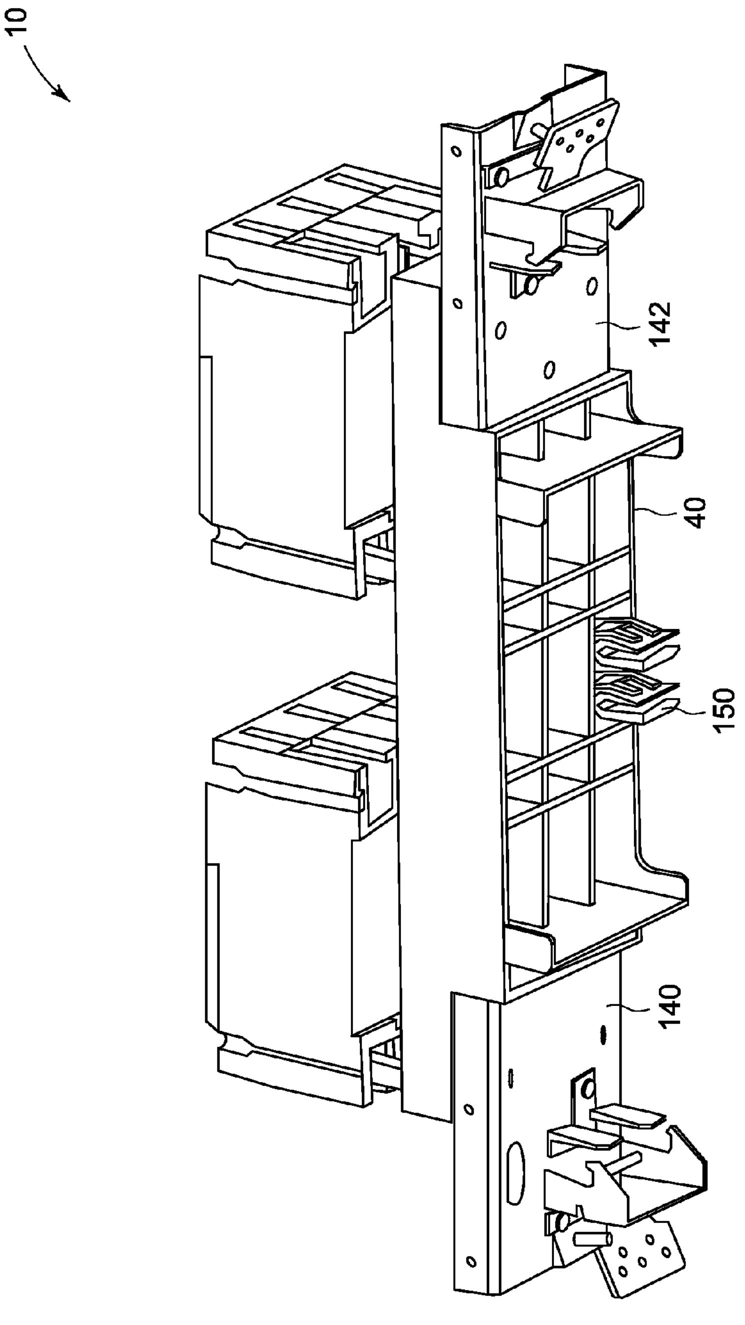
FIG. 5 is another isometric view of the mounting module of FIG. 1.

Referring to FIGS. 2 and 5, the mounting assemblies 140, 142 are coupled to the second side of the electrically non-conductive base portion 40. The mounting assemblies 140, 142 are configured to be removably coupled to the DC distribution assembly 12.

Referring to FIGS. 5 and 6, the attachment assembly 150 is configured to be physically and electrically coupled to the DC distribution assembly 12. The attachment assembly 150 receives a DC voltage from the DC distribution assembly 12 having a positive polarity. The attachment assembly 150 is physically and electrically coupled to the electrically conductive strap 50 utilizing the bolts 98, 99.

Referring to FIGS. 2 and 7, the functionality of the mounting module 10 will now be explained. In particular, a description of the current flow through the mounting module 10 will be explained. Initially, a DC voltage having a positive polarity is received at the electrically conductive strap 50 from the DC distribution assembly 12. Thereafter, a first electrical current flows from the electrically conductive strap 50 and through the breaker post 100. From the breaker post 100, the first electrical current flows through the line side 200 of the breaker pole assembly 20 and the breakable pole 204 to the load side 202 of the breaker pole assembly 20. From the load side 202 of the breaker pole assembly 20, the first electrical current flows through the breaker post 102 and the electrically conductive strap 52 to the breaker post 104. From the breaker post 104, the first electrical current flows through the line side 220 of the breaker pole assembly 22 and the breakable pole 224 to the load side 222 of the breaker pole assembly 22. From the load side 222 of the breaker pole assembly 22, the first electrical current flows through the breaker post 106 and the electrically conductive strap 54 to the breaker post 108. From the breaker post 108, the first electrical current flows through the line side 230 of the breaker pole assembly 24 and the breakable pole 234 to the load side 232 of the breaker pole assembly 24. From the load side 232, the first electrical current flows to the positive load 170.

Also, when the DC voltage having the positive polarity is received at the electrically conductive strap 50, a second electrical current flows from the electrically conductive strap 50 and through the breaker post 120. From the breaker post 120, the second electrical current flows through the line side 240 of the breaker pole assembly 26 and the breakable pole 244 to the load side 242 of the breaker pole assembly 26. From the load side 242 of the breaker pole assembly 262, the second electrical current flows through the breaker post 122 and the electrically conductive strap 56 to the breaker post 124. From the breaker post 124, the second electrical current flows through the line side 250 of the breaker pole assembly 28 and the breakable pole 254 to the load side 252 of the breaker pole assembly 28. From the load side 252 of the breaker pole assembly 28, the second electrical current flows through the breaker post 126 and the electrically conductive strap 58 to the breaker post 128. From the breaker post 128, the second electrical current flows through the line side 260 of the breaker pole assembly 30 and the breakable pole 264 to the load side 262 of the breaker pole assembly 30. From the load side 262, the second electrical current flows to the positive load 172.

Figure 8:
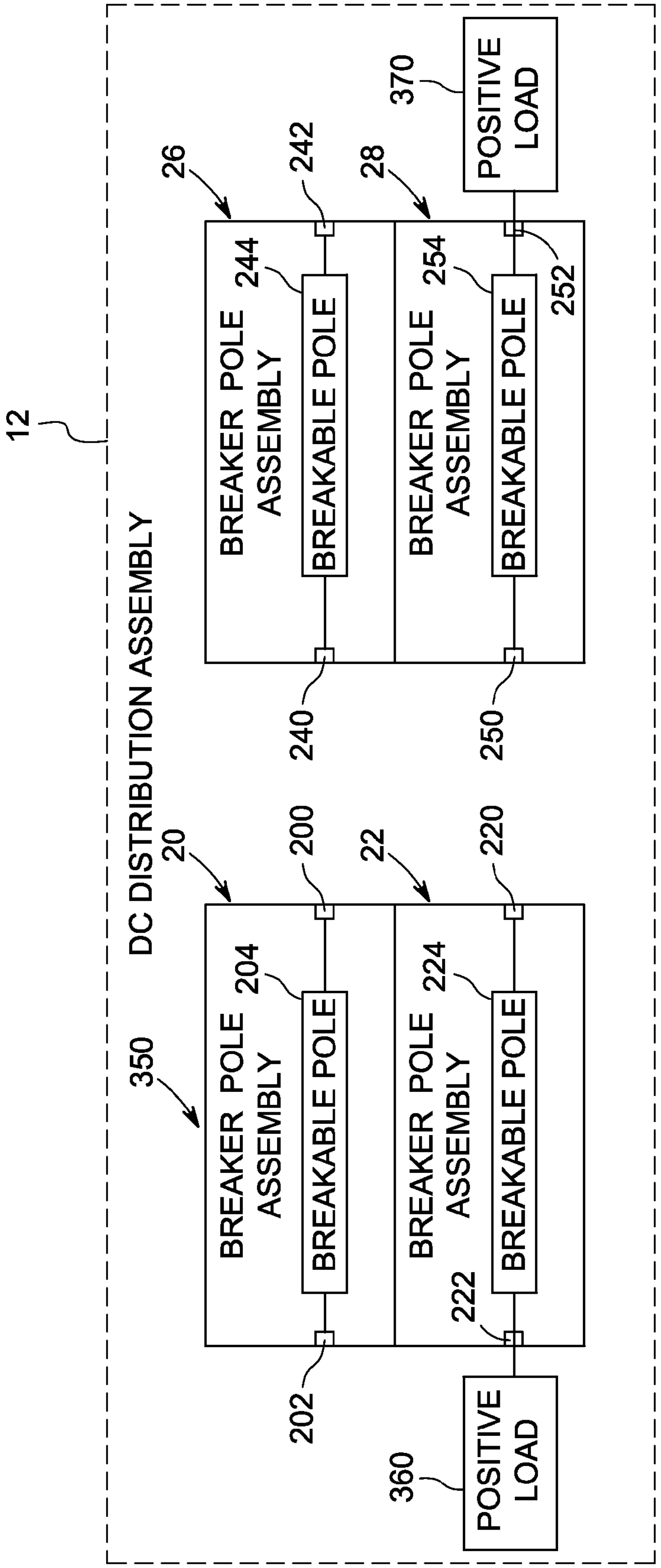
FIG. 8 is a block diagram of a mounting module for a DC distribution assembly that is configured to electrically break two positive poles in each group of breaker pole assemblies in accordance with another exemplary embodiment.
Figure 9:
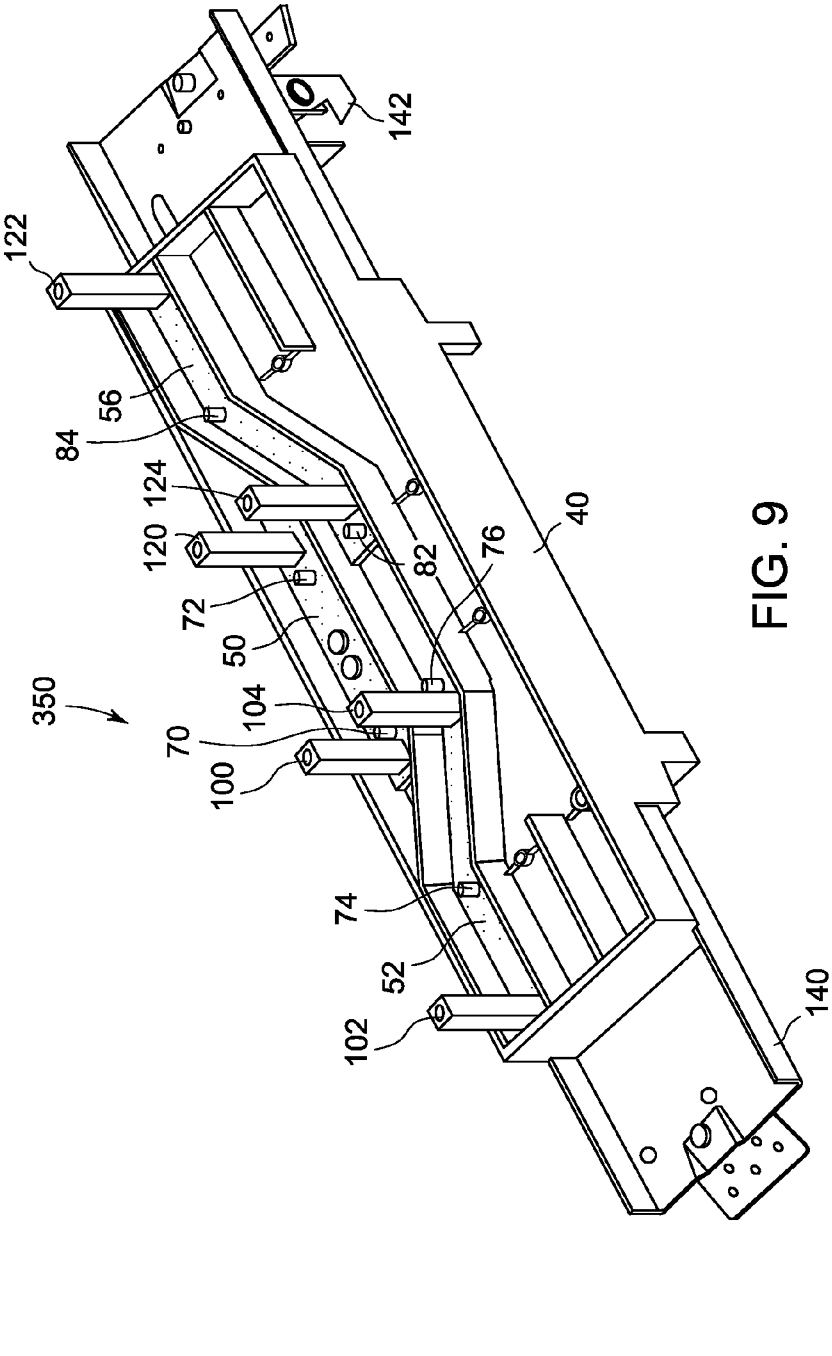
FIG. 9 is an isometric view of a portion of the mounting module of FIG. 8.
Figure 10:
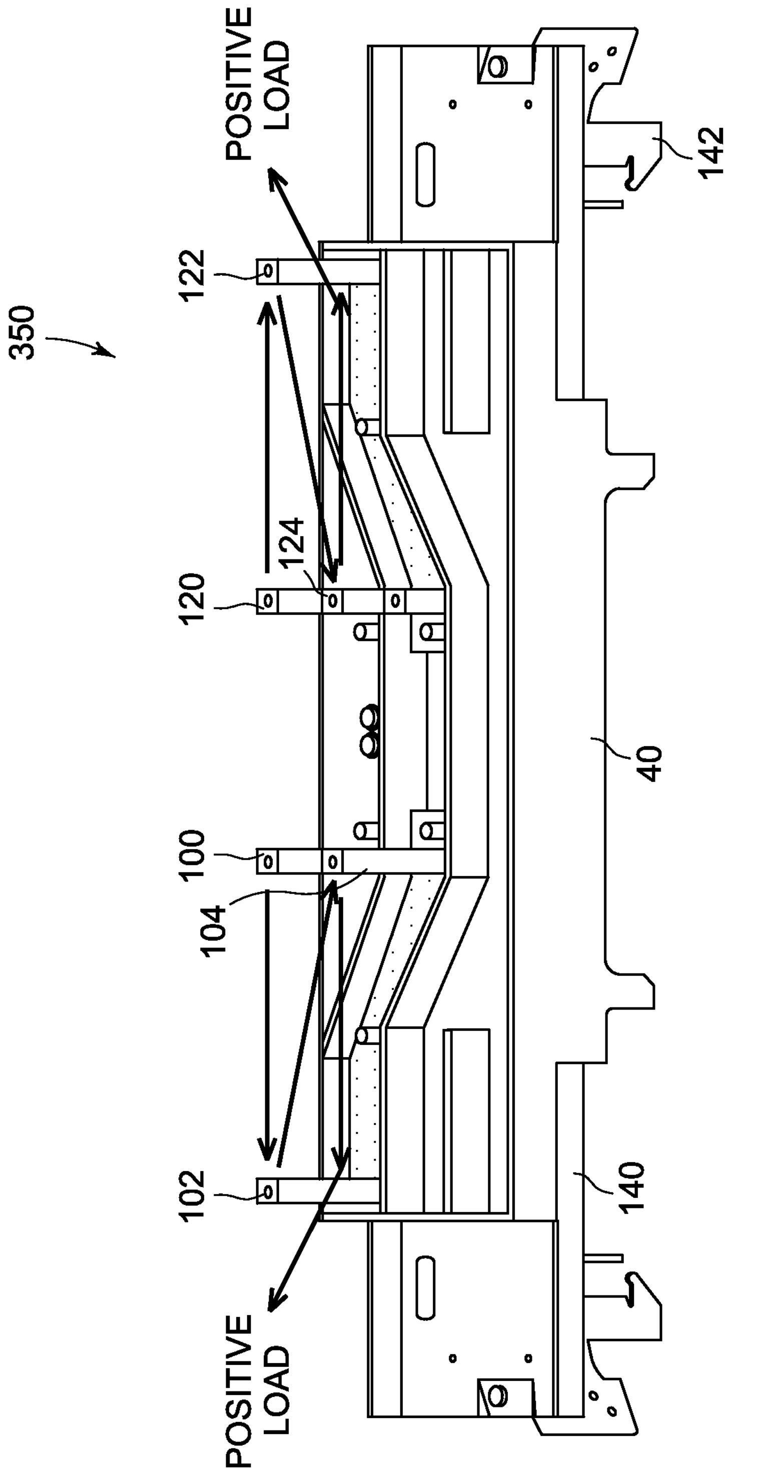
FIG. 10 is another isometric view of a portion of the mounting module of FIG. 8 illustrating a general direction of electrical current flow through the mounting module.
Figure 11:
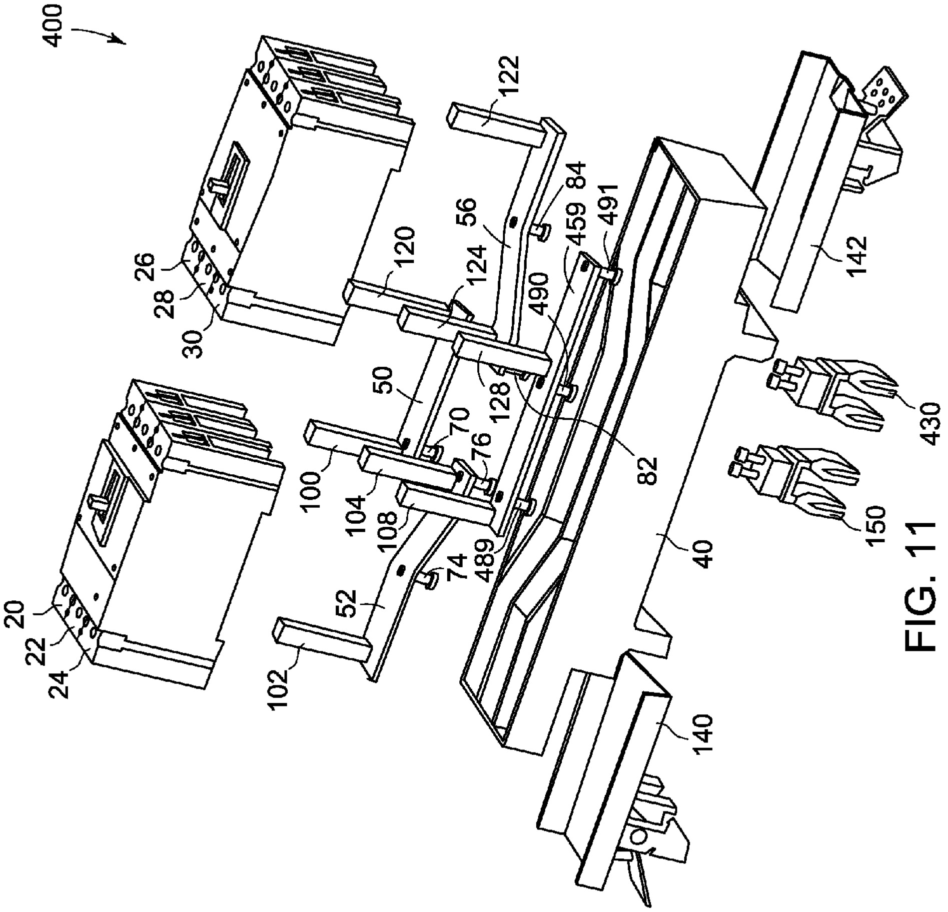
FIG. 11 is an exploded schematic of a mounting module for a DC distribution assembly that is configured to electrically break two positive poles and one negative pole in each group of breaker pole assemblies in accordance with another exemplary embodiment.

Referring to FIGS. 8-10, a mounting module 350 that is configured to be removably coupled to the DC distribution assembly 12, in accordance with another exemplary embodiment is provided. The mounting module 350 includes a subset of the components of the mounting module 10. In particular, the mounting module 350 includes the breaker pole assemblies 20, 22, 26, 28, the electrically non-conductive base portion 40, the electrically conductive straps 50, 52, 56, bolts 70, 72, 76, 82, 84, the breaker posts 100, 102, 104, 120, 122, 124, the mounting assemblies 140, 142 and the attachment assembly 150. The mounting module 10 is configured to electrically break two positive breakable poles in each group of breaker pole assemblies (e.g. one group being the breaker pole assemblies 20, 22) if an excess amount of electrical current is detected.

In one exemplary embodiment, the load side 222 of the breaker pole assembly 22 is electrically coupled to a positive load 360. Also, the load side 252 of the breaker pole assembly 28 is electrically coupled to a positive load 370.

The functionality of the mounting module 350 will now be explained. In particular, a description of the current flow through the mounting module 350 will be explained. Initially, a DC voltage having a positive polarity is received at the electrically conductive strap 50 from the DC distribution assembly 12. Thereafter, a first electrical current flows from the electrically conductive strap 50 and through the breaker post 100. From the breaker post 100, the first electrical current flows through the line side 200 of the breaker pole assembly 20 and the breakable pole 204 to the load side 202 of the breaker pole assembly 20. From the load side 202 of the breaker pole assembly 20, the first electrical current flows through the breaker post 102 and the electrically conductive strap 52 to the breaker post 104. From the breaker post 104, the first electrical current flows through the line side 220 of the breaker pole assembly 22 and the breakable pole 224 to the load side 222 of the breaker pole assembly 22. From the load side 222 of the breaker pole assembly 22, the first electrical current flows through the positive loads 360.

Also, when the DC voltage having the positive polarity is received at the electrically conductive strap 50, a second electrical current flows from the electrically conductive strap 50 and through the breaker post 120. From the breaker post 120, the second electrical current flows through the line side 240 of the breaker pole assembly 26 and the breakable pole 244 to the load side 242 of the breaker pole assembly 26. From the load side 242 of the breaker pole assembly 262, the second electrical current flows through the breaker post 122 and the electrically conductive strap 56 to the breaker post 124. From the breaker post 124, the second electrical current flows through the line side 250 of the breaker pole assembly 28 and the breakable pole 254 to the load side 252 of the breaker pole assembly 28. From the load side 252 of the breaker pole assembly 28, the second electrical current flows through the positive load 370.

Referring to FIGS. 11-14, a mounting module 400 that is configured to be removably coupled to the DC distribution assembly 12, in accordance with another exemplary embodiment is provided. The mounting module 400 includes several of the components of the mounting module 10. In particular, the mounting module 400 includes the breaker pole assemblies 20, 22, 24, 26, 28, 30, the electrically non-conductive base portion 40, the electrically conductive straps 50, 52, 56, 59, the bolts 70, 72, 74, 76, 82, 84, 489, 490, 491, the breaker posts 100, 102, 104, 108, 120, 122, 124, 128, the mounting assemblies 140, 142, and an attachment assembly 150, and an attachment assembly 430. The mounting module 400 is configured to electrically break two positive breakable poles and one negative breakable pole in each group of breaker pole assemblies (e.g., one group being the breaker pole assemblies 20, 22, 24) if an excess amount of electrical current is detected.

Since the structure of the mounting module 400 is similar to the mounting module 10, only the differing components and differing configuration will be discussed in greater detail below.

Figure 12:
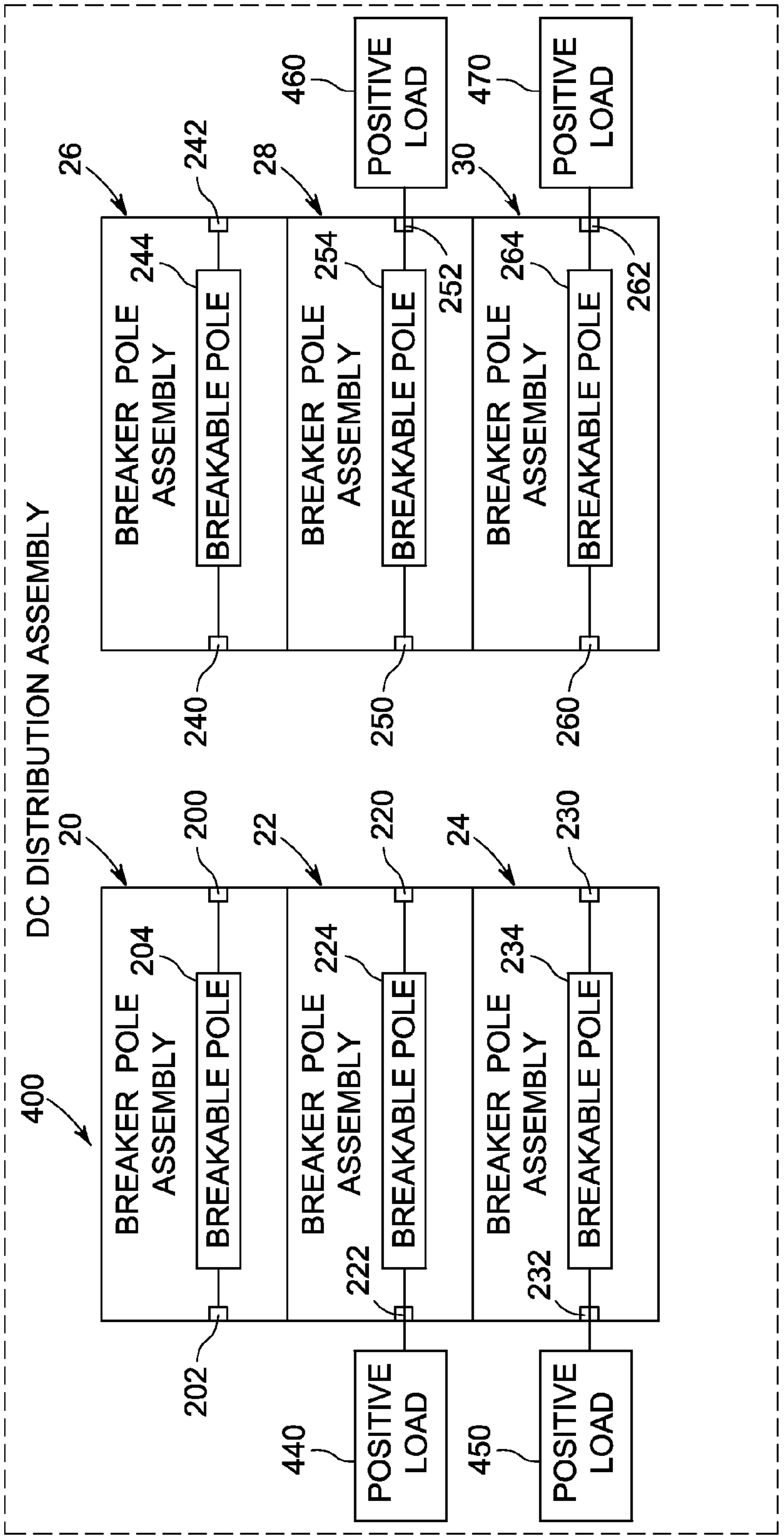
FIG. 12 is a block diagram of the mounting module of FIG. 11.
Figure 13:
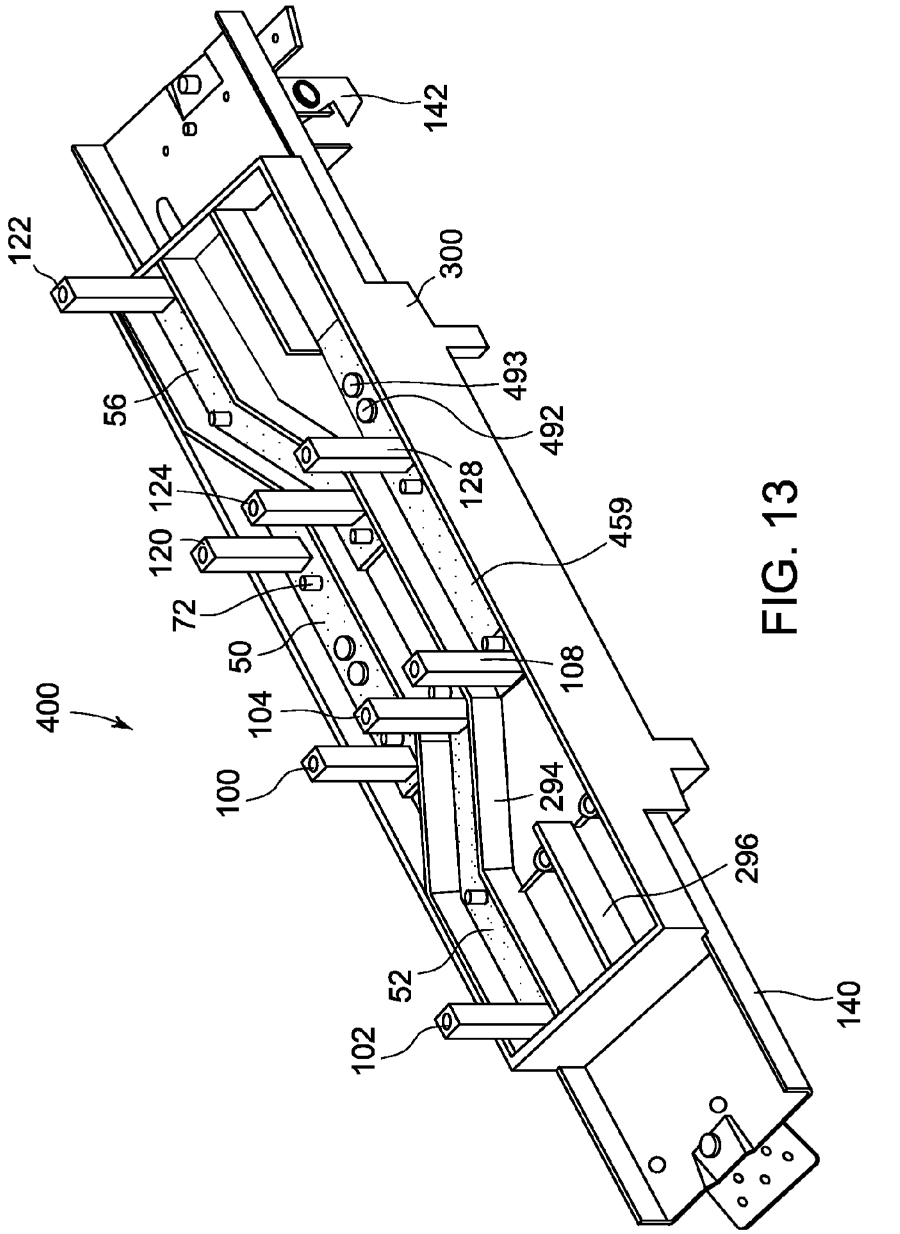
FIG. 13 is an isometric view of a portion of the mounting module of FIG. 11.

Referring to FIGS. 12 and 13, the electrically conductive strap 459 is disposed on the first side of the base portion 40 between the peripheral wall 300 and the wall 294. The electrically conductive strap 459 is coupled to the base portion 40 utilizing bolts 489, 490, 491. The bolts 492, 493 are utilized to physically and electrically couple the strap 459 to the attachment assembly 430 that is further configured to be coupled to the DC distribution assembly 12 to receive a positive DC voltage polarity from the DC distribution assembly 12.

In one exemplary embodiment, the load side 222 of the breaker pole assembly 22 is electrically coupled to a positive load 440, and the load side 232 of the breaker pole assembly 24 is electrically coupled to a negative load 450. Further, the load side 252 of the breaker pole assembly 28 is electrically coupled to a positive load 460, and the load side 262 of the breaker pole assembly 30 is electrically coupled to a positive load 470.

The breaker posts 108, 128 are physically and electrically coupled to the electrically conductive strap 459 utilizing bolts. In one exemplary embodiment, the breaker post 108 is also physically and electrically coupled to the line side 230 of the breaker pole assembly 24. Also, the breaker post 128 is physically and electrically coupled to the line side 260 of the breaker pole assembly 30.

Figure 14:
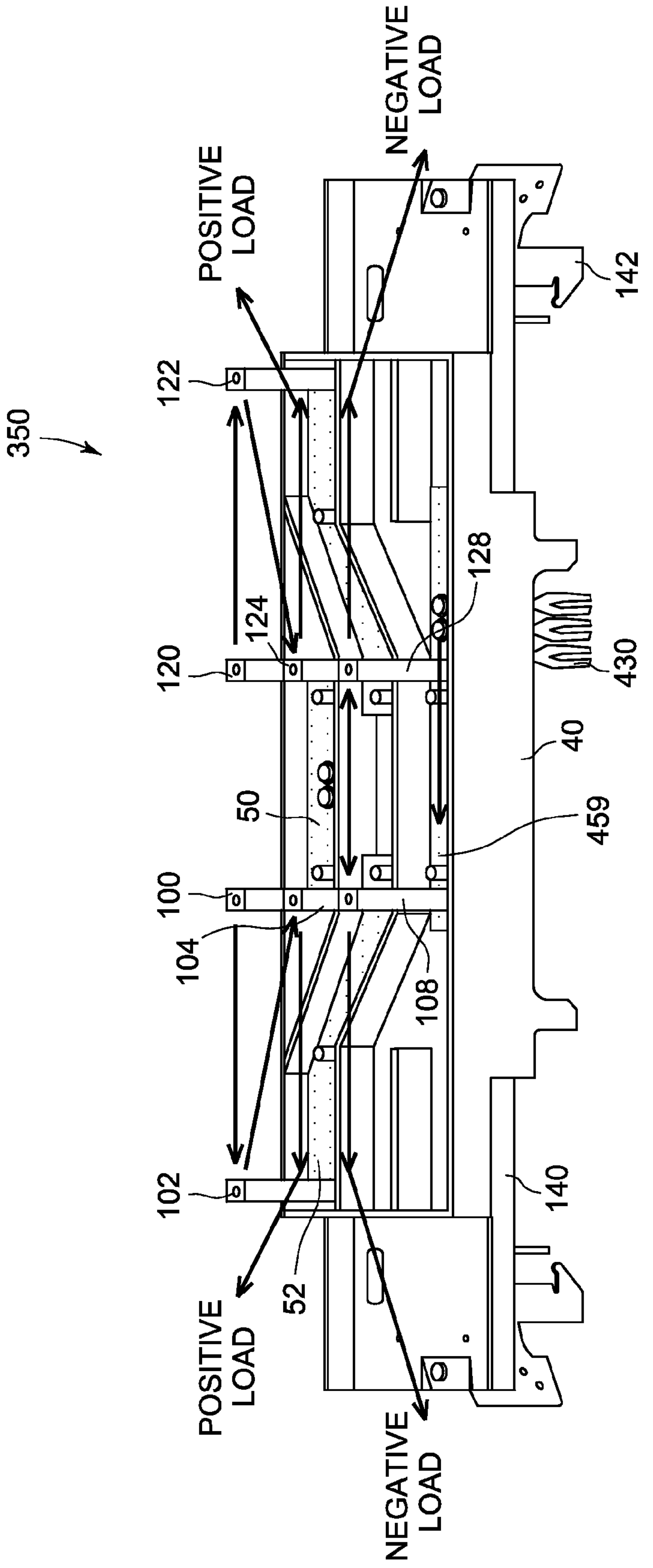
FIG. 14 is another isometric view of a portion of the mounting module of FIG. 11 illustrating a general direction of electrical current flow through the mounting module.

Referring to FIGS. 12-14, the functionality of the mounting module 400 will now be explained. In particular, a description of the current flow through the mounting module 400 will be explained. Initially, a DC voltage having a positive polarity is received at the electrically conductive strap 50 from the DC distribution assembly 12. Thereafter, a first electrical current flows from the electrically conductive strap 50 and through the breaker post 100. From the breaker post 100, the first electrical current flows through the line side 200 of the breaker pole assembly 20 and the breakable pole 204 to the load side 202 of the breaker pole assembly 20. From the load side 202 of the breaker pole assembly 20, the first electrical current flows through the breaker post 102 and the electrically conductive strap 52 to the breaker post 104. From the breaker post 104, the first electrical current flows through the line side 220 of the breaker pole assembly 22 and the breakable pole 224 to the load side 222 of the breaker pole assembly 22. From the load side 222 of the breaker pole assembly 22, the first electrical current flows to the positive load 440.

Also, when a DC voltage having a negative polarity is received at the electrically conductive strap 459 from the DC distribution assembly 12, a second electrical current flows from the electrically conductive strap 459 and through the breaker post 108. From the breaker post 108, the second electrical current flows through the line side 230 of the breaker pole assembly 24 and the breakable pole 234 to the load side 232 of the breaker pole assembly 24. From the load side 232 of the breaker pole assembly 24, the second electrical current flows to the negative load 450.

Also, when the DC voltage having the positive polarity is received at the electrically conductive strap 50, a third electrical current flows from the electrically conductive strap 50 and through the breaker post 120. From the breaker post 120, the third electrical current flows through the line side 240 of the breaker pole assembly 26 and the breakable pole 244 to the load side 242 of the breaker pole assembly 26. From the load side 242 of the breaker pole assembly 262, the third electrical current flows through the breaker post 122 and the electrically conductive strap 56 to the breaker post 124. From the breaker post 124, the third electrical current flows through the line side 250 of the breaker pole assembly 28 and the breakable pole 254 to the load side 252 of the breaker pole assembly 28. From the load side 252 of the breaker pole assembly 28, the third electrical current flows to the positive load 460.

Further, when the DC voltage having the negative polarity is received at the electrically conductive strap 459. Thereafter, a fourth electrical current flows from the electrically conductive strap 459 and through the breaker post 128. From the breaker post 128, the fourth electrical current flows through the line side 260 of the breaker pole assembly 30 and the breakable pole 264 to the load side 262 of the breaker pole assembly 30. From the load side 262 of the breaker pole assembly 30, the fourth electrical current flows to the negative load 470.

Figure 15:
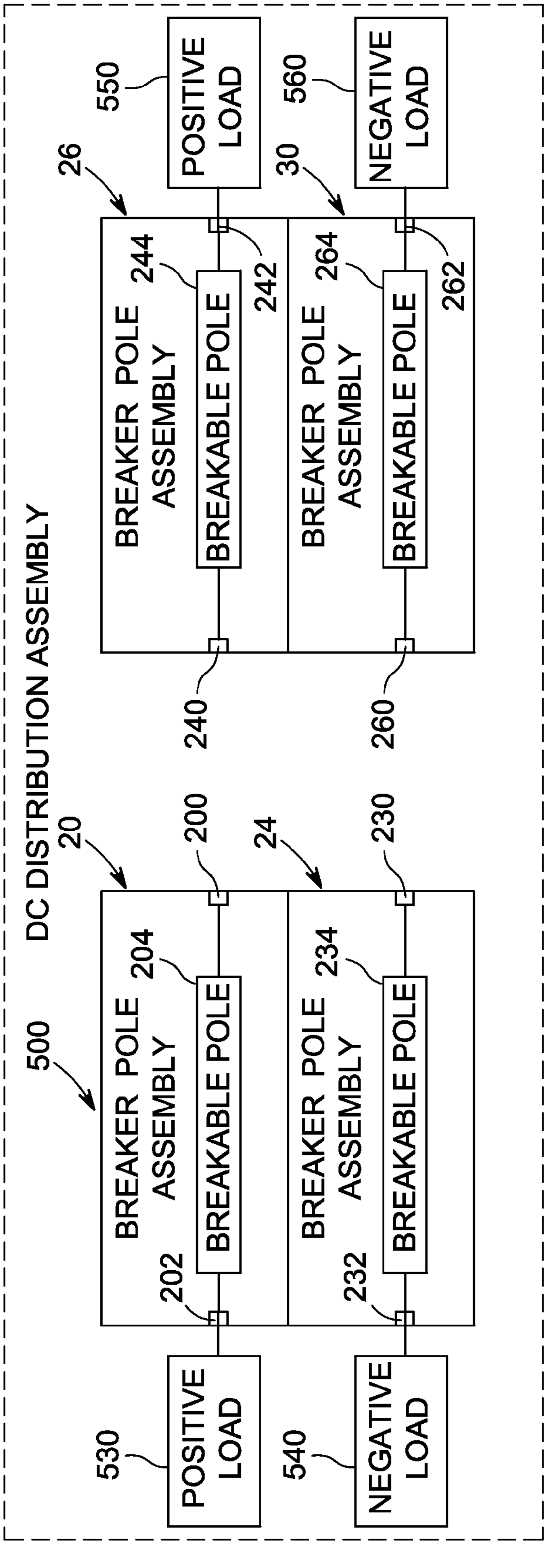
FIG. 15 is a block diagram of a mounting module for a DC distribution assembly that is configured to electrically break one positive pole and one negative pole in each group of breaker pole assemblies in accordance with another exemplary embodiment.
Figure 16:
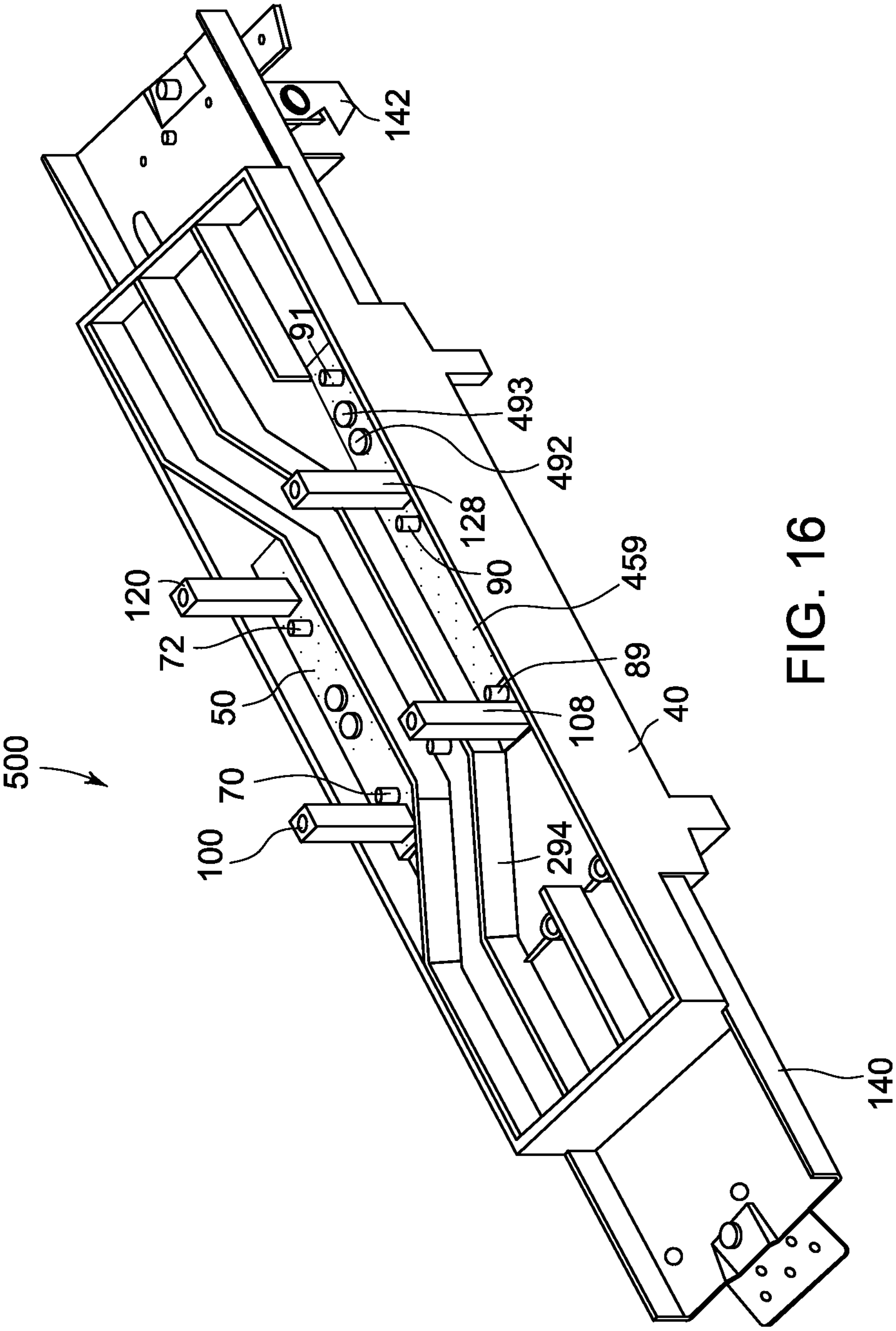
FIG. 16 is an isometric view of a portion of the mounting module of FIG. 15.
Figure 17:
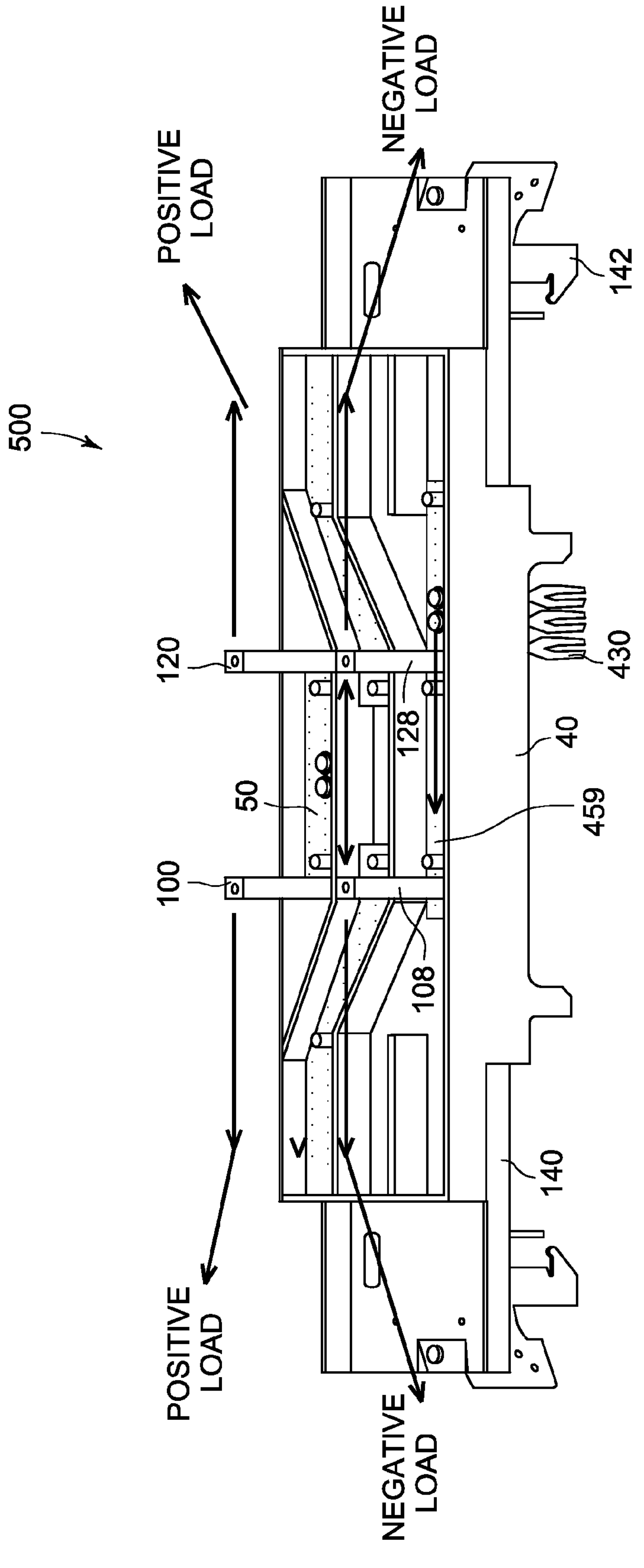
FIG. 17 is another isometric view of a portion of the mounting module of FIG. 15 illustrating a general direction of electrical current flow through the mounting module.

Referring to FIGS. 15-17, a mounting module 500 that is configured to be removably coupled to the DC distribution assembly 12, in accordance with another exemplary embodiment is provided. The mounting module 500 includes a subset of the components of the mounting module 400. In particular, the mounting module 500 includes breaker pole assemblies 20, 24, 26, 30, the electrically non-conductive base portion 40, the electrically conductive straps 50, 459, bolts 70, 72, 89, 90, 91, the breaker posts 100, 108, 120, 128, the mounting assemblies 140, 142 and the clip assemblies 150, 430. The mounting module 500 is configured to electrically break one positive breakable pole and one negative breakable pole in each group of breaker pole assemblies (e.g. one group being the breaker pole assemblies 20, 24) if an excess amount of electrical current is detected.

In one exemplary embodiment, the load side 202 of the breaker pole assembly 20 is electrically coupled to the positive load 530, and the load side 232 of the breaker pole assembly 24 is electrically coupled to the negative load 540. Also, the load side 242 of the breaker pole assembly 26 is electrically coupled to the positive load 550, and the load side 262 of the breaker pole assembly 30 is electrically coupled to a negative load 560.

Referring to FIGS. 15-17, the functionality of the mounting module 500 will now be explained. In particular, a description of the current flow through the mounting module 500 will be explained. Initially, a DC voltage having a positive polarity is received at the electrically conductive strap 50 from the DC distribution assembly 12. Thereafter, a first electrical current flows from the electrically conductive strap 50 and through the breaker post 100. From the breaker post 100, the first electrical current flows through the line side 200 of the breaker pole assembly 20 and the breakable pole 204 to the load side 202 of the breaker pole assembly 20. From the load side 202 of the breaker pole assembly 20, the first electrical current flows to the positive load 530.

Also, when a DC voltage having a negative polarity is received at the electrically conductive strap 459 from the DC distribution assembly 12. Thereafter, a second electrical current flows from the electrically conductive strap 459 and through the breaker post 108. From the breaker post 108, the second electrical current flows through the line side 230 of the breaker pole assembly 24 and the breakable pole 234 to the load side 232 of the breaker pole assembly 24. From the load side 232 of the breaker pole assembly 24, the second electrical current flows to the negative load 540.

Also, when the DC voltage having a positive polarity is received at the electrically conductive strap 50, a third electrical current flows from the electrically conductive strap 50 and through the breaker post 120. From the breaker post 120, the third electrical current flows through the line side 240 of the breaker pole assembly 26 and the breakable pole 244 to the load side 242 of the breaker pole assembly 26. From the load side 242 of the breaker pole assembly 262, the third electrical current flows through the positive load 550.

Further, when the DC voltage having the negative polarity is received at the electrically conductive strap 459. Thereafter, a fourth electrical current flows from the electrically conductive strap 459 and through the breaker post 128. From the breaker post 128, the fourth electrical current flows through the line side 260 of the breaker pole assembly 30 and the breakable pole 264 to the load side 262 of the breaker pole assembly 30. From the load side 262 of the breaker pole assembly 30, the fourth electrical current flows through the negative load 560.

The mounting modules described herein represent a substantial advantage over other breaker assemblies known to those skilled in the art. In particular, the mounting modules utilize electrically conductive straps that are disposed on and coupled to an electrically non-conductive base portion to electrically couple breaker pole assemblies in series with one other. The technical effect of the mounting modules is that there is no longer a need to connect numerous wires to breaker pole assemblies to electrically connect the breaker pole assemblies in series to one another.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A mounting module for a DC distribution assembly, comprising:

an electrically non-conductive base portion configured to hold at least first and second electrically conductive straps thereon, the first and second electrically conductive straps being disposed on and coupled to the electrically non-conductive base portion;

a first breaker pole assembly having a first line side electrically coupled to the first electrically conductive strap, the first breaker pole assembly further having a first load side, and a first breakable pole disposed between the first line side and the first load side; and a second breaker pole assembly having a second line side electrically coupled to the second electrically conductive strap, the second breaker pole assembly further having a second load side, and a second breakable pole disposed between the second line side and the second load side.

2. The mounting module of claim 1, further comprising:

first and second mounting assemblies coupled to the electrically non-conductive base portion, the first and second mounting assemblies configured to be removably coupled to the DC distribution assembly;

a first attachment assembly configured to be coupled to the electrically non-conductive base portion and further electrically coupled to the first electrically conductive strap, the first attachment assembly configured to receive a first DC voltage from the DC distribution assembly; and a second attachment assembly configured to be coupled to the electrically non-conductive base portion and further electrically coupled to the second electrically conductive strap, the second attachment assembly configured to receive a second DC voltage from the DC distribution assembly.

3. The mounting module of claim 1, wherein the first breaker pole assembly is configured to receive the first DC voltage having a first voltage polarity, and the second breaker pole assembly is configured to receive the second DC voltage having a second voltage polarity.

4. The mounting module of claim 3, wherein the first voltage polarity and the second voltage polarity are opposite voltage polarities from one another.

5. The mounting module of claim 1, further comprising:

a first breaker post coupled between the first electrically conductive strap and the first line side of the first breaker pole assembly; and a second breaker post coupled between the second electrically conductive strap and the second line side of the second breaker pole assembly.

6. The mounting module of claim 5, wherein the first load side of the first breaker pole assembly is configured to be coupled to a first external load, and the second load side of the second breaker pole assembly is configured to be coupled to a second external load.

7. The mounting module of claim 6, further comprising:

a third breaker post coupled to the first electrically conductive strap;

a fourth breaker post coupled to the second electrically conductive strap;

a third breaker pole assembly disposed longitudinally across from the first breaker pole assembly, the third breaker pole assembly having a third line side coupled to the third breaker post, and a third load side configured to be coupled to a third external load, the third breaker pole assembly having a third breakable pole disposed between the third line side and the third load side; and a fourth breaker pole assembly disposed longitudinally across from the second breaker pole assembly, the fourth breaker pole assembly having a fourth line side coupled to the fourth breaker post, and a fourth load side configured to be coupled to a fourth external load, the fourth breaker pole assembly having a fourth breakable pole disposed between the fourth line side and the fourth load side.

8. The mounting module of claim 5, further comprising:

a third electrically conductive strap being disposed on and coupled to the electrically non-conductive base portion;

a third breaker post coupled to the third electrically conductive strap;

a fourth breaker post coupled to the third electrically conductive strap;

the first load side of the first breaker pole assembly coupled to the third electrically conductive strap; and a third breaker pole assembly disposed between the first and second breaker pole assemblies, the third breaker pole assembly having a third line side coupled to the fourth breaker post, and a third load side, the third breaker pole assembly further having a third breakable pole disposed between the third line side and the third load side.

9. The mounting module of claim 8, wherein the third load side of the third breaker pole assembly is configured to be coupled to a first external load, and the second load side of the second breaker pole assembly is configured to be coupled to a second external load.

10. The mounting module of claim 8, further comprising:

a fourth electrically conductive strap being disposed on and coupled to the electrically non-conductive base portion;

a fifth breaker post coupled to the first electrically conductive strap;

a sixth breaker post coupled to the fourth electrically conductive strap;

a seventh breaker post coupled to the fourth electrically conductive strap;

an eighth breaker post coupled to the second electrically conductive strap;

a fourth breaker pole assembly disposed longitudinally across from the first breaker pole assembly, the fourth breaker pole assembly having a fourth line side coupled to the fifth breaker post, and a fourth load side coupled to the sixth breaker post, the fourth breaker pole assembly further having a fourth breakable pole disposed between the fourth line side and the fourth load side;

a fifth breaker pole assembly disposed longitudinally across from the third breaker pole assembly, the fifth breaker pole assembly having a fifth line side coupled to the seventh breaker post, and a fifth load side, the fifth breaker pole assembly further having a fifth breakable pole disposed between the fifth line side and the fifth load side; and a sixth breaker pole assembly disposed longitudinally across from the second breaker pole assembly, the sixth breaker pole assembly having a sixth line side coupled to the eighth breaker post, and a sixth load side, the sixth breaker pole assembly further having a sixth breakable pole disposed between the sixth line side and the sixth load side.

11. The mounting module of claim 10, wherein:

the fifth load side of the fifth breaker pole assembly is configured to be coupled to a third external load; and the sixth load side of the sixth breaker pole assembly is configured to be coupled to a fourth external load.

12. The mounting module of claim 1, wherein the electrically non-conductive base portion includes a base plate and a wall, the wall extending outwardly from the base plate such that the wall is disposed between the first and second electrically conductive straps.

13. A mounting module for a DC distribution assembly, comprising:

an electrically non-conductive base portion configured to hold at least first and second electrically conductive straps thereon, the first and second electrically conductive straps being disposed on and coupled to the electrically non-conductive base portion;

a first breaker post coupled to the first electrically conductive strap;

a second breaker post coupled to the second electrically conductive strap;

a third breaker post coupled to the second electrically conductive strap;

a first breaker pole assembly having a first line side coupled to the first breaker post, and a first load side coupled to the second breaker post, the first breaker pole assembly having a first breakable pole disposed between the first line side and the first load side; and a second breaker pole assembly having a second line side coupled to the third breaker post, and a second load side, the second breaker pole assembly further having a second breakable pole disposed between the second line side and the second load side.

14. The mounting module of claim 13, further comprising:

first and second mounting assemblies coupled to the electrically non-conductive base portion, the first and second mounting assemblies configured to be removably coupled to the DC distribution assembly; and a first attachment assembly configured to be coupled to the electrically non-conductive base portion and further electrically coupled to the first electrically conductive strap, the first attachment assembly configured to receive a first DC voltage from the DC distribution assembly.

15. The mounting module of claim 13, wherein the second load side of the second breaker pole assembly is configured to be coupled to a first external load.

16. The mounting module of claim 15, further comprising:

a third electrically conductive strap being disposed on and coupled to the electrically non-conductive base portion;

a fourth breaker post coupled to the first electrically conductive strap;

a fifth breaker post coupled to the third electrically conductive strap;

a sixth breaker post coupled to the third electrically conductive strap;

a third breaker pole assembly disposed longitudinally across from the first breaker pole assembly, the third breaker pole assembly having a third line side coupled to the fourth breaker post, and a third load side configured to be coupled to the fifth breaker post, the third breaker pole assembly having a third breakable pole disposed between the third line side and the third load side; and a fourth breaker pole assembly disposed longitudinally across from the second breaker pole assembly, the fourth breaker pole assembly having a fourth line side coupled to the sixth breaker post, and a fourth load side configured to be coupled to a second external load, the fourth breaker pole assembly having a fourth breakable pole disposed between the fourth line side and the fourth load side.

17. The mounting module of claim 13, further comprising:

a third electrically conductive strap being disposed on and coupled to the electrically non-conductive base portion;

a fourth breaker post coupled to the third electrically conductive strap;

a fifth breaker post coupled to the third electrically conductive strap;

the second breaker pole assembly having a second load side coupled to the fourth breaker post; and a third breaker pole assembly having a third line side coupled to the fifth breaker post, and a third load side, the third breaker pole assembly further having a third breakable pole disposed between the third line side and the third load side.

18. The mounting module of claim 17, wherein the third load side of the third breaker pole assembly is configured to be coupled to a first external load.

19. The mounting module of claim 17, further comprising:

a fourth electrically conductive strap being disposed on and coupled to the electrically non-conductive base portion;

a fifth electrically conductive strap being disposed on and coupled to the electrically non-conductive base portion;

a sixth breaker post coupled to the first electrically conductive strap;

a seventh breaker post coupled to the fourth electrically conductive strap;

an eighth breaker post coupled to the fourth electrically conductive strap;

a ninth breaker post coupled to the fifth electrically conductive strap;

a tenth breaker post coupled to the fifth electrically conductive strap;

a fourth breaker pole assembly disposed longitudinally across from the first breaker pole assembly, the fourth breaker pole assembly having a fourth line side coupled to the sixth breaker post, and a fourth load side coupled to the seventh breaker post, the fourth breaker pole assembly having a fourth breakable pole disposed between the fourth line side and the fourth load side;

a fifth breaker pole assembly disposed longitudinally across from the second breaker pole assembly, the fifth breaker pole assembly having a fifth line side coupled to the eighth breaker post, and a fifth load side coupled to the ninth breaker post, the fifth breaker pole assembly further having a fifth breakable pole disposed between the fifth line side and the fifth load side; and a sixth breaker pole assembly disposed longitudinally across from the third breaker pole assembly, the sixth breaker pole assembly having a sixth line side coupled to the tenth breaker post, and a sixth load side, the sixth breaker pole assembly further having a sixth breakable pole disposed between the sixth line side and the sixth load side.

20. The mounting module of claim 19, wherein the sixth load side of the sixth breaker pole assembly is configured to be coupled to a second external load.

* * * * *

UNITED STATES PATENT AND TRADEMARK OFFICE

CERTIFICATE OF CORRECTION

PATENT NO. : 8,482,905 B2
APPLICATION NO. : 13/181933
DATED : July 9, 2013
INVENTOR(S) : Mooney et al.

It is certified that error appears in the above-identified patent and that said Letters Patent is hereby corrected as shown below:

In the Drawings

Fig. 12, Drawing Sheet 12 of 17, for Tag “450”, Lines 1-2, delete “POSITIVE LOAD” and insert -- NEGATIVE LOAD --, therefor.

Fig. 12, Drawing Sheet 12 of 17, for Tag “470”, Lines 1-2, delete “POSITIVE LOAD” and insert -- NEGAT1VE LOAD --, therefor.

In the Specifications

Column 1, Line 62, delete “DRAWING” and insert -- DRAWINGS --, therefor.

Column 7, Lines 63-64, delete “positive load 470.” and insert -- negative load 470. --, therefor.

Signed and Sealed this
Eighteenth Day of March, 2014

Michelle K. Lee

Michelle K. Lee
*Deputy Director of the United States Patent and Trademark Office*